(12) United States Patent
Kalb

(10) Patent No.: US 8,173,955 B2
(45) Date of Patent: May 8, 2012

(54) METHODS AND APPARATUS TO OPTICALLY DETERMINE VELOCITIES OF DOWNHOLE FLUIDS

(75) Inventor: Frederique Kalb, Boncourt (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 243 days.

(21) Appl. No.: 12/430,913

(22) Filed: Apr. 28, 2009

(65) Prior Publication Data

US 2010/0270464 A1    Oct. 28, 2010

(51) Int. Cl.
*G01V 5/08* (2006.01)
(52) U.S. Cl. .................................................. 250/269.1
(58) Field of Classification Search .................. 250/254, 250/255, 256, 269.1, 356.1
See application file for complete search history.

(56) References Cited

U.S. PATENT DOCUMENTS

| | | | |
|---|---|---|---|
| 2,936,371 A | 5/1960 | White et al. | |
| 4,228,353 A | 10/1980 | Johnson | |
| 6,321,839 B1 | 11/2001 | Vereecken et al. | |
| 2003/0029995 A1* | 2/2003 | Mullins et al. | 250/302 |
| 2007/0095528 A1 | 5/2007 | Ziauddin et al. | |
| 2007/0289739 A1* | 12/2007 | Cooper et al. | 166/250.01 |

FOREIGN PATENT DOCUMENTS

| | | |
|---|---|---|
| EP | 0374822 | 6/1990 |
| GB | 2337107 | 11/1999 |
| WO | 2001/092685 | 12/2001 |

* cited by examiner

*Primary Examiner* — David Porta
*Assistant Examiner* — Faye Boosalis
(74) *Attorney, Agent, or Firm* — Jianguang Du; Jody DeStefanis; Jeff Griffin

(57) ABSTRACT

Methods and apparatus to optically determine velocities of downhole fluids are disclosed. Some example methods to determine a velocity of a downhole fluid include exciting a fluorescent substance in a downhole fluid with an optical signal via an optical interface. The example methods further include detecting fluorescence of the downhole fluid via an optical fiber at a predetermined distance from the optical interface, and determining the velocity of the downhole fluid based on the detected fluorescence.

21 Claims, 5 Drawing Sheets

METHODS AND APPARATUS TO OPTICALLY DETERMINE VELOCITIES OF DOWNHOLE FLUIDS

FIELD OF THE DISCLOSURE

This disclosure relates generally to oil production and, more particularly, to methods and apparatus to optically determine velocities of downhole fluids.

BACKGROUND

The flow rate of downhole fluids in an oil or gas production well is an important measurement during production logging. The flow rate of a downhole fluid provides a measurement of fluid output from a particular well and can be used to determine whether one or more phases (e.g., oil, gas, water) of the downhole fluids are clogging or otherwise inhibiting the production flow. Some existing techniques to determine the flow rate of a downhole fluid include using spinner tools or measuring tracer ejectors. Another known technique involves measuring the velocity of a water phase in the flowline by detecting excited oxygen molecules. These known downhole fluid flow rate measurement techniques typically utilize downhole equipment that is sensitive to the extreme conditions experienced downhole and, as a result, subject to breakage in those conditions.

SUMMARY

Example methods and apparatus to optically determine velocities of downhole fluids are described. Some example methods to determine a velocity of a downhole fluid include exciting a fluorescent substance in a downhole fluid with an optical signal via an optical interface. The example methods detect fluorescence in the downhole fluid via an optical fiber at a predetermined distance from the optical interface and determine the velocity of the downhole fluid based on the detected fluorescence.

In other examples, apparatus to determine a velocity of a downhole fluid are described. The example apparatus include an optical signal generator, a fluorescence detector, and a processing unit. The optical signal generator excites a fluorescent substance in the downhole fluid at a first downhole location, and the fluorescence detector detects fluorescence emitted by the excited fluorescent substance in the downhole fluid at a second downhole location. The processing unit is coupled to the optical signal generator and the fluorescence detector and generates an optical excitation signal via the optical signal generator, analyzes the fluorescence detected by the fluorescence detector, and determines the velocity of the downhole fluid based on the excitation signal and the detected fluorescence.

In other examples, systems to determine a velocity of a downhole fluid are described. Some example systems include an optical signal generator, a fluorescence detector, first and second optical fibers optically coupled to the optical signal generator and a fluorescence detector, respectively, a processor coupled to the optical signal generator and the fluorescence detector, and a memory coupled to the processor. The example optical signal generator generates an optical excitation signal and transmits the optical excitation signal via a first optical fiber to a first downhole optical interface, which transmits the optical excitation signal to the downhole fluid. The fluorescence detector detects fluorescence from the downhole fluid via a second optical fiber, which is optically coupled to the fluorescence detector and a second downhole optical interface to transmit fluorescence from the downhole fluid to the fluorescence detector. The processor is coupled to the optical signal generator and the fluorescence detector, and the memory stores machine readable instructions which, upon execution, cause the processor to determine a type of the optical excitation signal and the velocity of the downhole fluid based on the detected fluorescence.

DETAILED DESCRIPTION

Figure 1:
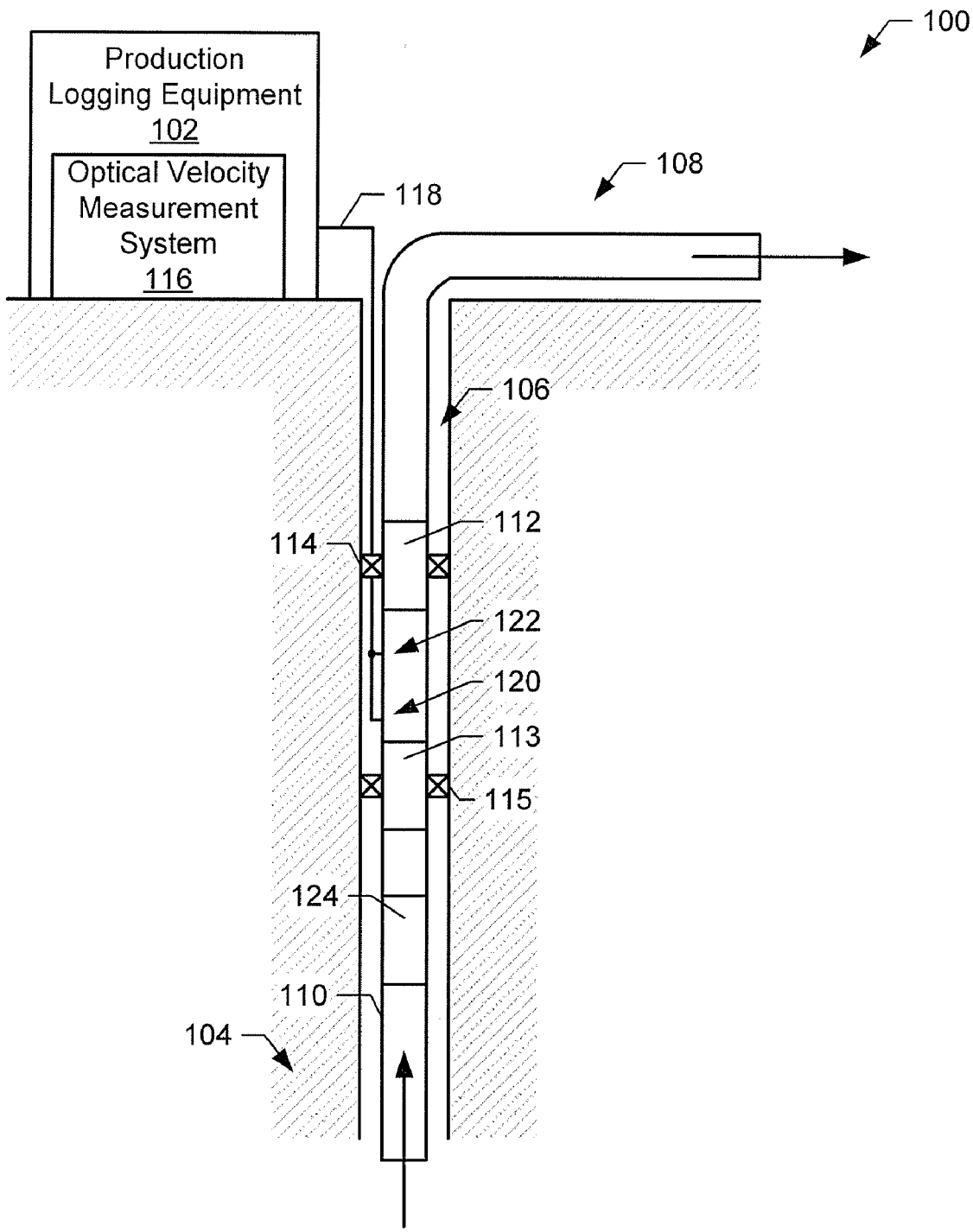
FIG. 1 illustrates an example wellsite including production logging tools within which the example methods and apparatus described herein may be implemented.

Certain examples are shown in the above-identified figures and described in detail below. In describing these examples, like or identical reference numbers are used to identify common or similar elements. The figures are not necessarily to scale and certain features and certain views of the figures may be shown exaggerated in scale or in schematic for clarity and/or conciseness. Although the following discloses example systems including, among other components, software or firmware executed on hardware, it should be noted that such systems are merely illustrative and should not be considered as limiting. For example, it is contemplated that any form of logic may be used to implement the systems or subsystems disclosed herein. Logic may include, for example, implementations that are made exclusively in dedicated hardware (e.g., circuits, transistors, logic gates, hard-coded processors, programmable array logic (PAL), application-specific integrated circuits (ASICs), etc.) exclusively in software, exclusively in firmware, or some combination of hardware, firmware, and/or software. Accordingly, while the following describes example systems, persons of ordinary skill in the art will readily appreciate that the examples are not the only way to implement such systems.

The example methods and apparatus described herein may be used to determine the velocity of downhole fluids during production logging by optically exciting and optically measuring fluorescent substances present in the downhole fluid. In the examples described herein, a first optical fiber couples an optical signal generator to a first downhole location, and the optical signal generator generates an optical signal. The optical signal is transmitted via the first optical fiber and excites one or more fluorescent substances present in the downhole fluid using a pulse of optical energy. The optically excited fluorescent substances travel with the downhole fluid, or in one or more phases (e.g., oil, gas, water) thereof, while emitting optical signals (e.g., fluorescing) in response to the excitation. At a predetermined distance downstream from the first optical fiber (e.g., closer to the surface), a second optical fiber detects the optical signals emitted from the excited fluorescent substances and transmits the optical signals to a fluorescence detector (e.g., located at the surface). The fluorescence detector may then use the time difference between the emission of the optical excitation signals and the receipt of the optical signals by the second or downstream optical fiber to determine a fluid flow rate. The first and second optical fibers may be optically coupled to the downhole fluids, thereby eliminating the requirement for downhole control or detection systems (i.e., systems located downhole) to determine the downhole fluid flow rate. As a result, the example methods and apparatus described herein may be used to improve the reliability of the fluid flow rate detection systems because sensitive electronic control systems do not have to be exposed to the harsh conditions of a downhole environment but, rather, can be located at the surface.

The fluorescent substances may be inherently present in the formation fluid produced from a subterranean formation. Additionally or alternatively, one or more fluorescent substances may be injected into the downhole fluid at a constant or substantially constant rate. In examples where a fluorescent substance is injected, a mechanical, electromechanical, or chemical substance injector is located upstream from the first optical fiber and may be provided with one or more types of fluorescent substances, each of which may dissolve into one or more phases of the downhole fluid. The substance injector may be configured to allow injection of fluorescent substances at a constant rate without downhole electrical control systems, thereby improving reliability of the injector. Other uses and advantages of the example methods and apparatus will be apparent in view of the descriptions of the drawings provided below.

FIG. 1 illustrates an example wellsite 100 including production logging equipment 102. The example wellsite 100 of FIG. 1 is configured for production of a hydrocarbon fluid (e.g., raw gas and/or oil) from a subterranean formation 104. A wellbore 106 has been drilled into the formation 104 at a surface location 108 and a production flowline 110 is inserted into the wellbore 106. The production flowline 110 includes pumps 112 and 113 to pump the hydrocarbon fluid from the subterranean formation 104 to the surface 108, where it may be used or refined. During production, packers 114 and 115 are typically inflated around the production flowline 110 to maintain pressure in the wellbore 106.

As mentioned above, the velocity of downhole fluids (e.g., natural gas and/or oil) is an important measurement in production logging because the velocity may be used to determine output and to determine whether any particular downhole fluid phases are clogging the flowline 110. In the example system of FIG. 1, the production logging equipment 102 includes an optical velocity measurement system 116, which optically determines the velocity of one or more phases of downhole fluid moving through the flowline 110.

The example optical velocity measurement system 116 is optically coupled to the flowline 110 via a plurality of (e.g., two) fiber optic cables or optical fibers, which are depicted in FIG. 1 as one cable or line 118. As described in detail below, the optical fibers in the example cable 118 convey optical signals between the flowline 110 and the optical velocity measurement system 116. The optical signals are used to determine the velocity of one or more phases of the downhole fluid. The examples described herein utilize wavelengths in the infrared spectrum, but any other optical wavelength may be used instead.

The optical fibers in the cable 118 are optically coupled to the flowline 110 at a first optical interface 120 and a second optical interface 122. The first optical interface 120 conveys optical signals from the optical velocity measurement system 116 and the cable 118 to the downhole fluid. The optical signals excite fluorescent substances in the downhole fluid and cause the fluorescent substances to emit optical signals. The second optical interface 122, which is located a known distance downstream from the first optical interface 120, collects the optical signals emitted by the fluorescent substances. The optical velocity measurement system 116 logs the time (e.g., via a system clock or counter) at which the optical signals are conveyed to the fluid via the first optical interface 120 and the time at which the optical signals are detected at the second optical interface 122. As described in more detail below, the optical velocity measurement system 116 determines the velocity of the downhole fluid using the difference between the logged times and the known distance between the optical interfaces 120 and 122.

In some examples, the downhole fluid inherently includes fluorescent substances. In other examples, fluorescent substances such as Rhodamine are injected into the downhole fluid. To inject fluorescent substances into the downhole fluid, the optical velocity measurement system 116 further includes a substance injector 124 downhole. The example substance injector 124 autonomously injects one or more fluorescent substance(s) into the downhole fluid upstream from the first optical interface 120. The fluorescent substance(s) then flow past the first optical interface 120 and the second optical interface 122, where optical velocity measurement system 116 excites and detects the fluorescent substances to determine the fluid velocity.

Figure 2:
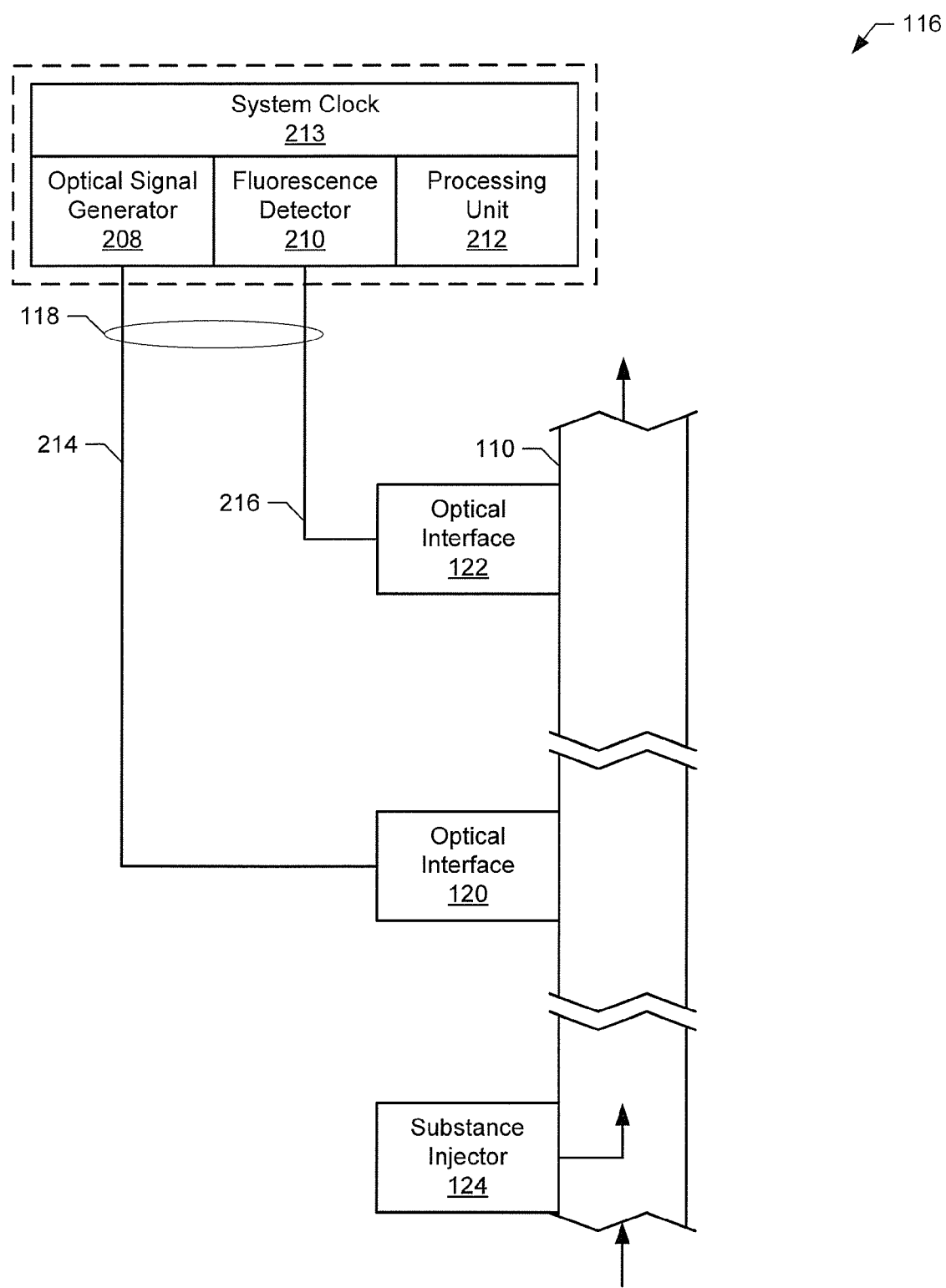
FIG. 2 is a more detailed block diagram of the example optical velocity measurement system of FIG. 1.

FIG. 2 is a more detailed block diagram of the example optical velocity measurement system 116 of FIG. 1. Particular sections of the flowline 110 are illustrated in FIG. 2 to show the relative positioning of the optical velocity measurement system 116 components. However, the positioning illustrated in FIG. 2 is not necessarily to scale, and relative distances (e.g., between optical interfaces 120 and 122) may be modified based on, for example, the fluorescence decay time of the substance(s) used. In general, longer or larger distances yield a calculated velocity closer to the average velocity of the phase(s) of the downhole fluid, but the fluorescence decay time of the fluorescent substance used may establish a practical maximum distance.

On the surface, the optical velocity measurement system 116 includes an optical signal generator 208, a fluorescence detector 210, and a processing unit 212. The optical signal generator 208 generates an optical signal at one or more frequencies to excite one or more fluorescent substances in a downhole fluid. For example, the optical signal generator 208 may be implemented using a laser or a light-emitting diode (LED) and corresponding control devices. The optical signal generated by the optical signal generator 208 is transmitted downhole via a first fiber optic cable or optical fiber 214 (which may be contained in the cable 118) as described below.

The frequencies of the optical signal provided by the signal generator 208 are generally dependent on or suitable for use with the fluorescent substance(s) in the downhole fluid. In cases where the fluorescent substances) are injected into the downhole fluid, both the substance(s) and the optical signal may be chosen based on the type(s) of downhole fluid. For instance, some types of fluorescent substances will dissolve in only one or two types or phases of a downhole fluid. Additionally, some fluorescent substances are excited only by particular wavelengths.

The fluorescence detector 210 receives optical signals generated by excited fluorescent substances in the downhole fluid. A second fiber optic cable or optical fiber 216 optically couples the fluorescence detector 210 to the downhole fluid as described below. After receiving an optical signal resulting from downhole fluid fluorescence, the fluorescence detector 210 determines the time at which the optical signal is received (e.g., relative to the time excitation was provided by the optical signal generator 208) and whether the energy, power, and/or intensity of the signal exceeds or reaches a threshold sufficient to indicate that the fluorescence was in response to an optical signal generated by the optical signal generator 208. For example, a limited amount of fluorescence may be received due to optically excited fluorescent substances in the downhole fluid that are not a result of the optical excitation provided by the optical signal generator 208. Additionally, a sufficient intensity of optical signal may be received, but at a different wavelength than expected from the downhole fluid. Thus, the fluorescence detector 210 may record the time and/or intensity of the received optical signal(s) if the intensity and/or wavelength meet certain predetermined criteria or, alternatively, may ignore the optical signals if one or more of the criteria are not met.

The optical velocity measurement system 116 further includes the processing unit 212 to perform, among other things, data processing and data logging. The processing unit 212 may also control the frequency and/or power of the optical signals generated by the optical signal generator 208. The desired or optimal frequency and/or power of the optical signals to be provided by the optical signal generator 208 may be determined based on the types and phases of downhole fluid, which are generally determined from sample testing, testing while drilling, or testing during production. The processing unit 212 may further manage a system clock 213, to which the optical signal generator 208 and the fluorescence detector 210 are synchronized.

The optical signal generator 208 generates an optical signal (e.g., a light wavelength, a laser) and transmits the signal downhole via the fiber optic cable 214. The fiber optic cable 214 interfaces with the flowline 110 via a first optical interface 120 at a first location on the flowline 110. The example optical interface 120 may include a transparent window through which the fiber optic cable may transmit the optical signal provided by the optical signal generator 208. The optical interface 120 may include a cleaning mechanism, which cleans the optical interface 120 if the optical interface 120 becomes dirty or blocked. Additionally or alternatively, the optical interface 120 may include one or more damage prevention apparatus to prevent the downhole conditions from damaging the fiber optic cable 214.

A second optical interface 122 is located at a second position on the flowline 110 and optically couples the fiber optic cable 216 to the downhole fluid in the flowline 110. Optical signals, such as fluorescence, are detected and/or collected at the second optical interface 122 for transmission to the fluorescence detector 210 via the fiber optic cable 216. The example second optical interface 122 is located at a downstream location relative to the first optical interface 120, which is typically closer to the surface than the fist optical interface 120.

The example optical velocity measurement system 116 may further include the substance injector 124 coupled to the flowline 110 at a third location. The example substance injector 124 may be a mechanical or electromechanical device configured to inject one or more fluorescent substances into the downhole fluid, although a chemical injector may also be used instead of or in addition to a mechanical or electromechanical injector. The substance injector 124 may inject the fluorescent substance(s) at a substantially continuous rate or in any other desired manner. Fluorescent substances are injected at a location upstream from the first optical interface 120 such that the injected substances are excited by the optical signal generator 208 via the fiber optic cable 214 as the downhole fluid containing the injected substances flows past the optical interface 120.

While the example optical signal generator 208, the example fluorescence detector 210, the example processing unit 212, the example system clock 213, and, more generally, the example optical velocity measurement system 116 are shown at the surface 108 in FIGS. 1 and 2, any one or more of the optical signal generator 208, the fluorescence detector 210, the processing unit 212, the system clock 213, and, more generally, the optical velocity measurement system 116 may be located in the borehole 106. In such examples, the components located downhole are selected to withstand downhole temperature and pressure conditions.

Figure 3:
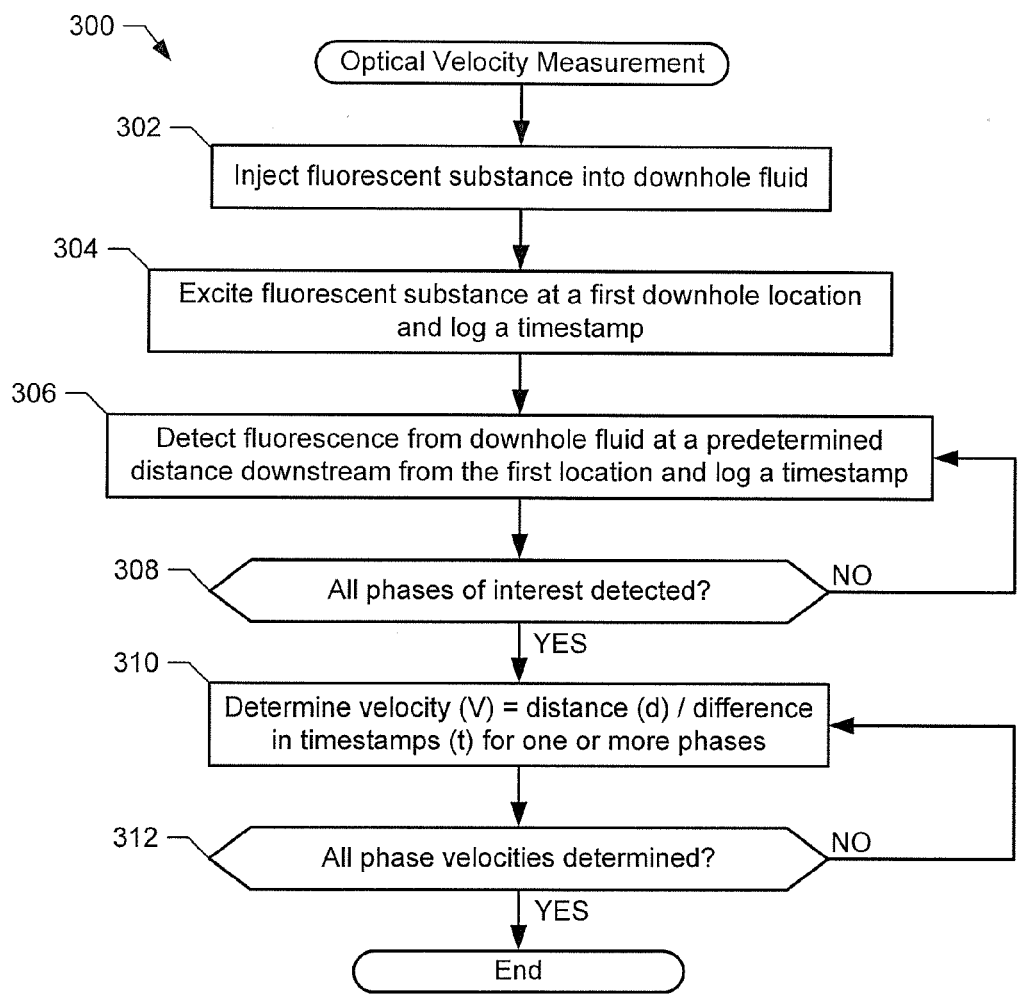
FIG. 3 is a flowchart illustrating an example method that may be implemented by the example optical velocity measurement system of FIG. 2 to optically measure fluid velocity.

FIG. 3 is a flowchart illustrating an example method 300 that may be implemented using the optical velocity measurement system 116 of FIG. 2 to optically measure fluid velocity. The example method 300 may be used to implement the optical signal generator 208, the fluorescence detector 210, the processing unit 212, or, more generally, the optical velocity measurement system 116 of FIG. 2.

The example method 300 begins by injecting one or more fluorescent substance(s) into the downhole fluid (e.g., via the substance injector 124) (block 302). The fluorescent substances may be chosen to dissolve in one or more particular phases of the downhole fluid. In some examples, the downhole fluid includes a fluorescent substance prior to injecting the fluorescent substance via the substance injector 124 (FIG. 2). If the downhole fluid inherently includes (e.g., is composed of) fluorescent substances dissolved in the phases of interest, the injection operation of block 302 may be omitted.

The method 300 then, at a first downhole location, excites the fluorescent substance(s) in the downhole fluid and logs a timestamp (block 304). For example, the optical signal generator 208 may generate an optical signal to excite one or more particular fluorescent substances via the example fiber optic cable 214 and optical interface 120 of FIG. 2. Particular types or frequencies of optical energy may be used to excite particular fluorescent substances that are chosen to monitor particular phases of the downhole fluid. The excitation signal is generally pulsed for a particular or predetermined time. Thus, the excitation signal excites a finite amount or volume of fluorescent substance in the flowing downhole fluid. The system clock 213 logs a timestamp at the time of excitation to later determine the amount of time between excitation and detection.

After a time following the application of the excitation signal (block 304), the method 300 detects fluorescence in the downhole fluid at a predetermined distance downstream from the first location and logs another timestamp (block 306). The fluorescence in the downhole fluid is detected at the fluorescence detector 210 via the optical interface 122 and the fiber optic cable 216. In some cases, more than one phase of the downhole fluid is measured, and the measured phases may not flow at the same velocities. The detection timestamp is used in combination with the excitation timestamp (block 304) and a known distance to determine the fluid velocity. After detecting fluorescence (block 306), the fluorescence detector 210 determines whether all phases of interest have been detected (block 308). The fluorescent substances in different phases of downhole fluid may emit different wavelengths of optical energy when excited. By determining the wavelengths of detected energy, the fluorescence detector 210 determines whether one or more phases of the downhole fluid have not been detected. If any phases of interest have not been detected (block 308), control returns to block 306 to detect additional fluorescence.

If all phases of interest have been detected (block 308), the processing unit 212 determines, based on the time at which the excitation signal was applied (block 304) and the time at which the fluorescence was detected (block 306), the velocity of the one or more phases of the downhole fluid (block 310). The distance between the first 120 and second 122 optical interfaces is known and, thus, the processing unit 212 may determine the velocity (V) of the downhole fluid by dividing the distance (d) between the optical interfaces by the time (t) difference between the excitation timestamp (block 304) and the detection timestamp (block 306). Because the example optical signal generator 208 and the example fluorescence detector 210 use the same system clock 213, the time difference (t) can be measured accurately.

The processing unit 212 then determines whether all phase velocities have been determined for the phases detected in block 306 (block 312). If all the phase velocities have been determined (block 312), the method 300 may end or repeat to continue monitoring the flow velocities. If one or more velocities of the phases detected in block 306 have not been determined (block 312), control returns to block 310 to determine additional phase velocities.

Figure 4:
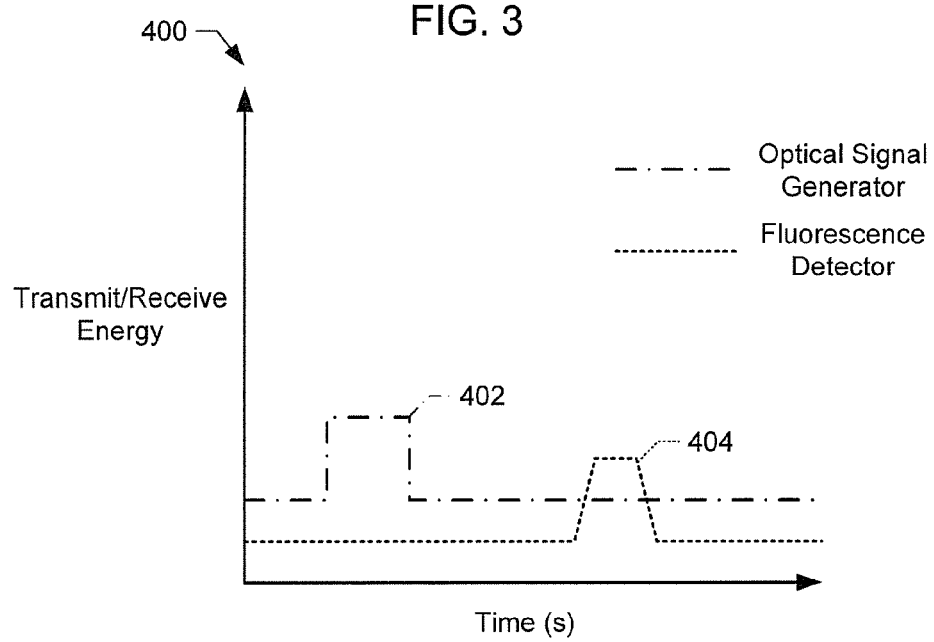
FIG. 4 illustrates a graph depicting an example time-energy relationship between the optical signal generator and the example fluorescence detector of FIG. 2.
Figure 5:
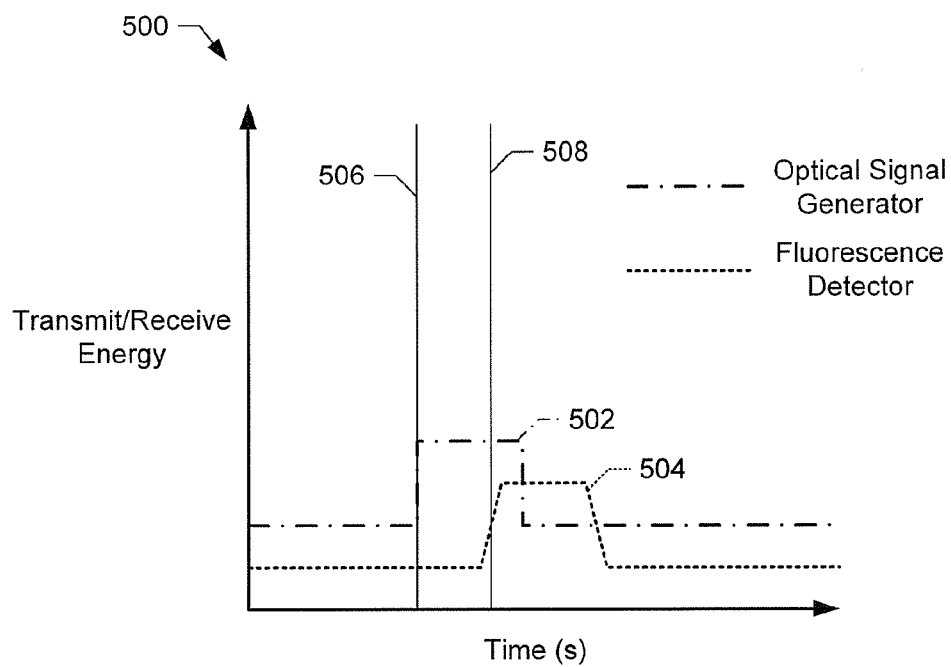
FIG. 5 illustrates a graph depicting a second example time-energy relationship between the optical signal generator and the example fluorescence detector of FIG. 2.
Figure 6:
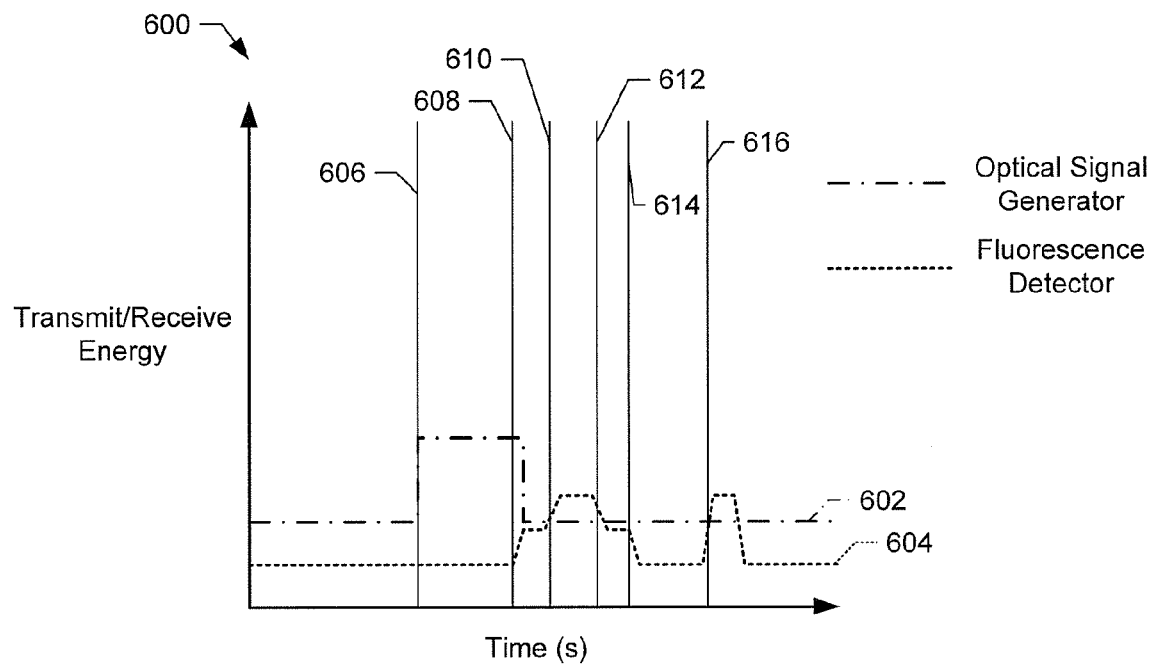
FIG. 6 illustrates a graph depicting another example time-energy relationship between the optical signal generator and the example fluorescence detector of FIG. 2.

FIGS. 4-6 generally illustrate graphs of example time-energy relationships at the optical signal generator 208 and the fluorescence detector 210 of FIG. 2. The time-energy relationships may occur, for example, when performing the method 300 shown in FIG. 3. While the graphs show particular energy levels and events occurring at particular times, the times and energy levels shown in the graphs of FIGS. 4-6 are intended to be relative and are not to scale.

FIG. 4 illustrates an example graph 400 of a first time-energy relationship at the optical signal generator 208 and the fluorescence detector 210 of FIG. 2. One cycle of optical excitation and fluorescence detection is shown in FIG. 4. A first curve 402 illustrates the transmit time-energy relationship of the optical signal generator 208, and a second curve 404 illustrates the detection time-energy relationship of the fluorescence detector 210. As described above, the optical signal generator 208 generates and transmits a pulsed optical excitation signal. The energy represented the first curve 402 is transmitted via the fiber optic cable 214 and the optical interface 120 to the downhole fluid.

At a time after the first curve 402 decreases in energy (e.g., the optical interface 120 ceases emitting optical energy), the second curve 404 increases in energy. The second curve represents fluorescence energy detected by the fluorescence detector 210 via the fiber optic cable 216 and the optical interface 122. In general, the energy of the second curve 404 will be less than the energy of the first curve 402 because not all of the energy produced by the optical signal generator 208 is detected by the fluorescence detector 210.

FIG. 5 illustrates a graph 500 depicting another example time-energy relationship at the optical signal generator 208 and the fluorescence detector 210 of FIG. 2. In the example of FIG. 5, the fluorescence detector 210 begins detecting energy, as shown by curve 504, after the optical signal generator 208 begins transmitting energy, as shown by the curve 502. However, the optical signal generator 208 does not finish transmitting energy before the fluorescence detector 210 begins detecting energy. Such a situation may occur if the distance between the location of the fiber optic cables (e.g., the cables 214 and 216 of FIG. 2) is relatively small, or if the phases of the downhole fluid carrying the fluorescent substances of interest are travelling relatively fast. As a result, the processing unit 212 of FIG. 2 may compare a time 506 at the beginning of optical signal transmission to a time 508 at the beginning of optical signal detection to determine velocity of the downhole fluid.

FIG. 6 illustrates a graph 600 of another example time-energy relationship between the optical signal generator 208 and the fluorescence detector 210 of FIG. 2. In the example relationship of FIG. 6, multiple phases of the downhole fluid have different velocities and, thus, are detected at different times. A first energy curve 602 represents the energy transmitted by the optical signal generator 208. A second energy curve 604 represents the energy detected by the fluorescence detector 604.

At a first time 606, the optical signal generator 208 transmits a pulse of optical energy to the downhole fluid. The pulse of optical energy that excites multiple fluorescent substances dissolved in multiple phases of the downhole fluid. At a second time 608, the fluorescence detector 610 detects fluorescent energy from one or more fluorescent substances dissolved in a first phase (i.e., the most rapidly-moving phase), and the detected energy curve 604 increases. At a third time 610, the fluorescence detector 210 detects fluorescent energy from additional fluorescent substances dissolved in a second phase, and the detected energy curve 604 increases fierier. At a fourth time 612, the fluorescence detector 210 no longer detects fluorescent energy from the first phase, and the detected energy curve 604 decreases to the energy detected in the second phase. At a fifth time 614, the fluorescence detector 210 no longer detects fluorescent energy from the second phase, and therefore no longer detects fluorescent energy.

The fluorescence detector 210 then detects fluorescent energy at a sixth time 616 from a third phase. The third phase is sufficiently slow that it is not detected while the first and/or second phases are detected at the fluorescence detector 210. The energy curve 604 increases to represent the detected energy from the third phase, and then decreases when the fluorescence detector 210 no longer detects fluorescent energy from the third phase.

While the example methods and apparatus to optically determine velocities of downhole fluids are described in connection with a production flowline such as that shown in FIGS. 1 and 2, the example methods and apparatus can be implemented with any other type of wellbore conveyance. For example, the example methods and apparatus can be implemented with a drill string including logging-while-drilling (LWD) and/or measurement-while-drilling (MWD) apparatus, coiled tubing, etc.

Figure 7:
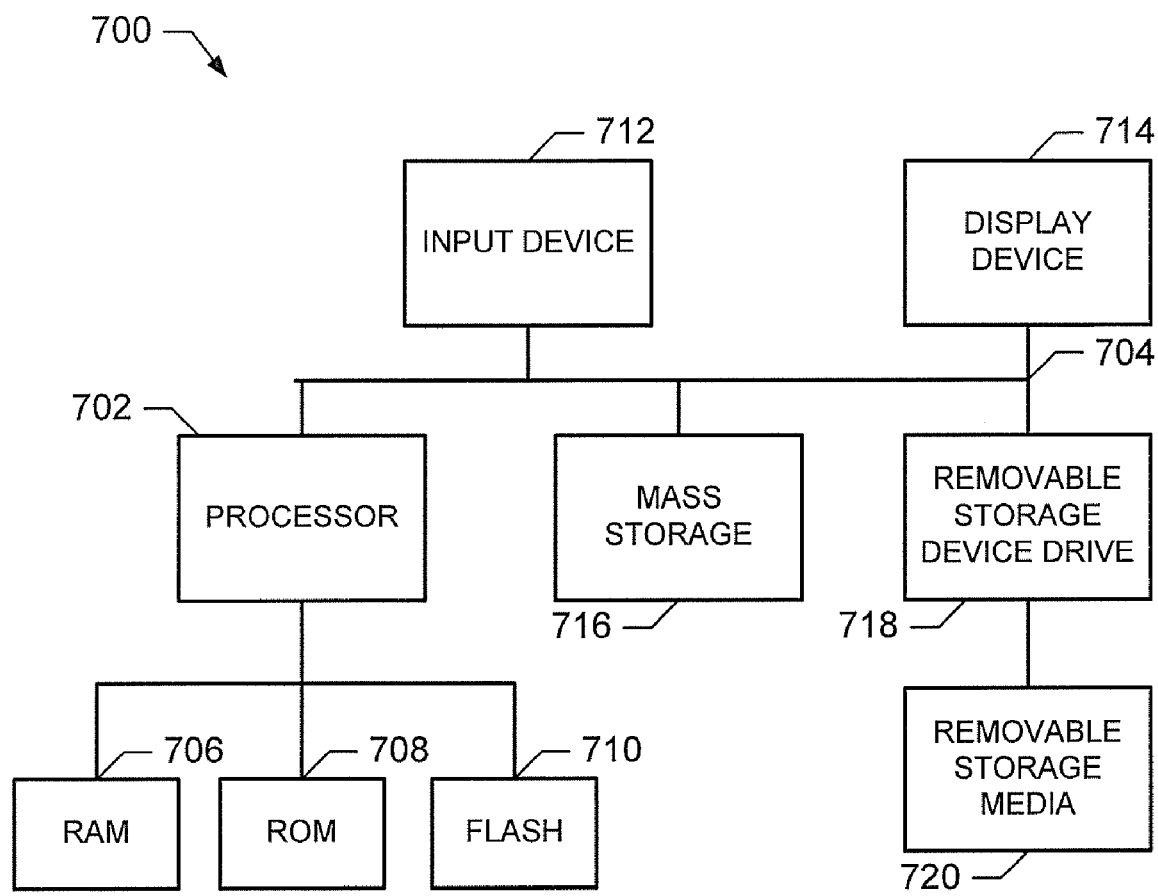
FIG. 7 is a block diagram of an example computing system that may be used to implement the example methods and apparatus described herein.

FIG. 7 is a block diagram of an example computing system 700 that may be used to implement the example methods and apparatus described herein. For example, the computing system 700 may be used to implement the above-described processing unit 212. The example computing system 700 may be, for example, a conventional desktop personal computer, a notebook computer, a workstation or any other computing device. A processor 702 may be any type of processing unit, such as a microprocessor from the Intel® Pentium® family of microprocessors, the Intel® Itanium® family of microprocessors, and/or the Intel XScale® family of processors. Memories 706, 708 and 710 that are coupled to the processor 702 may be any suitable memory devices and may be sized to fit the storage demands of the system 700. In particular, the flash memory 710 may be a non-volatile memory that is accessed and erased on a block-by-block basis.

An input device 712 may be implemented using a keyboard, a mouse, a touch screen, a track pad or any other device that enables a user to provide information to the processor 702.

A display device 714 may be, for example, a liquid crystal display (LCD) monitor, a cathode ray tube (CRT) monitor or any other suitable device that acts as an interface between the processor 702 and a user. The display device 714 as pictured in FIG. 7 includes any additional hardware required to interface a display screen to the processor 702.

A mass storage device 716 may be, for example, a conventional hard drive or any other magnetic or optical media that is readable by the processor 702.

A removable storage device drive 718 may, for example, be an optical drive, such as a compact disk-recordable (CD-R) drive, a compact disk-rewritable (CD-RW) drive, a digital versatile disk (DVD) drive or any other optical drive. It may alternatively be, for example, a magnetic media drive. A removable storage media 720 is complimentary to the removable storage device drive 718, inasmuch as the media 720 is selected to operate with the drive 718. For example, if the removable storage device drive 718 is an optical drive, the removable storage media 720 may be a CD-R disk, a CD-RW disk, a DVD disk or any other suitable optical disk. On the other hand, if the removable storage device drive 718 is a magnetic media device, the removable storage media 720 may be, for example, a diskette or any other suitable magnetic storage media.

Although example methods, apparatus and articles of manufacture have been described herein, the scope of coverage of this patent is not limited thereto. On the contrary, this patent covers every apparatus, method and article of manufacture fairly falling within the scope of the appended claims either literally or under the doctrine of equivalents.

What is claimed is:

1. A method to determine a velocity of a downhole fluid, comprising:
    exciting a fluorescent substance in a downhole fluid with an optical signal via an optical interface;
    detecting fluorescence of the downhole fluid via a first optical fiber at a predetermined distance from the optical interface; and
    determining the velocity of the downhole fluid based on the detected fluorescence.

2. A method as defined in claim 1, further comprising introducing the fluorescent substance into the downhole fluid.

3. A method as defined in claim 2, wherein the fluorescent substance is introduced into the downhole fluid at a substantially constant rate.

4. A method as defined in claim 1, further comprising introducing one or more fluorescent substances into the downhole fluid, wherein the downhole fluid comprises first and second phases, and wherein the one or more fluorescent substances dissolve in the first and second phases.

5. A method as defined in claim 4, further comprising determining a velocity of at least one of the first or second phases of the downhole fluid.

6. A method as defined in claim 1, wherein the optical signal is a pulse of optical energy.

7. A method as defined in claim 1, wherein determining the velocity of the downhole fluid comprises determining a time between exciting the fluorescent substance and detecting the fluorescence.

8. A method as defined in claim 1, wherein the optical signal comprises a laser signal.

9. A method as defined in claim 1, wherein the optical signal is generated at a surface location.

10. A method as defined in claim 9, further comprising transmitting the optical signal to the optical interface at a downhole location via a second optical fiber.

11. An apparatus to determine a velocity of a downhole fluid, comprising:
    an optical signal generator to excite a fluorescent substance in the downhole fluid at a first downhole location;
    a fluorescence detector to detect fluorescence emitted by the excited fluorescent substance in the downhole fluid at a second downhole location; and
    a processing unit coupled to the optical signal generator and the fluorescence detector to generate an optical excitation signal via the optical signal generator, to analyze the fluorescence detected by the fluorescence detector, and to determine the velocity of the downhole fluid based on the excitation signal and the detected fluorescence, and a distance between the first and second locations.

12. An apparatus as defined in claim 11, wherein the optical signal generator is optically coupled to the downhole fluid at the first downhole location via a first fiber optic cable, and the fluorescence detector is optically coupled to the downhole fluid at a second downhole location upstream from the first location.

13. An apparatus as defined in claim 11, further comprising a substance injector at a third downhole location to inject one or more fluorescent substances into the downhole fluid.

14. An apparatus as defined in claim 13, wherein the third downhole location is upstream from the first downhole location.

15. An apparatus as defined in claim 13, wherein the substance injector injects one or more fluorescent substances into the downhole fluid, wherein the downhole fluid comprises one or more phases, and wherein the one or more fluorescent substances dissolve in the-one or more phases.

16. An apparatus as defined in claim 11, wherein the second downhole location is a predetermined distance downstream from the first downhole location.

17. An apparatus as defined in claim 11, wherein the processing unit determines the velocity based on a time between exciting the fluorescent substance and detecting the fluorescence.

18. A system to determine a velocity of a downhole fluid, comprising:
    an optical signal generator to generate an optical excitation signal;
    a first optical fiber optically coupled to the optical signal generator and to a first downhole optical interface to transmit the optical excitation signal to the downhole fluid;
    a fluorescence detector to detect fluorescence from the downhole fluid;
    a second optical fiber optically coupled to the fluorescence detector and a second downhole optical interface to transmit fluorescence from the downhole fluid to the fluorescence detector;
    a processor coupled to the optical signal generator and the fluorescence detector; and
    a memory, coupled to the processor and storing machine readable instructions, which, upon execution, cause the processor to determine at least one of a frequency or power of the optical excitation signal and to determine the velocity of the downhole fluid based on the detected fluorescence, a time between exciting the fluorescent substance and detecting the fluorescence and a distance between the first and second downhole optical interfaces.

19. A system as defined in claim 18, wherein the downhole fluid comprises one or more phases, and wherein determining the velocity of the downhole fluid comprises determining the velocity of the one or more phases.

20. A system as defined in claim 18, further comprising a substance injector to inject one or more fluorescent substances into the downhole fluid.

21. A system as defined in claim 18, wherein the optical signal comprises an infrared signal.

* * * * *